(12) United States Patent
Kanehira et al.

(10) Patent No.: US 6,855,080 B2
(45) Date of Patent: *Feb. 15, 2005

(54) CHAIN (75) Inventors: Makoto Kanehira, Osaka (JP); Tomoyuki Saji, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 133 days.

This patent is subject to a terminal disclaimer.

(21) Appl. No.: 10/201,242

(22) Filed: Jul. 22, 2002

(65) Prior Publication Data
US 2003/0032511 A1 Feb. 13, 2003

(30) Foreign Application Priority Data
Aug. 9, 2001 (JP) ......................... 2001/242516

(51) Int. Cl.[7] ............................................. F16G 13/02
(52) U.S. Cl. ................... 474/231; 474/206; 384/564
(58) Field of Search ................. 474/206, 209, 474/231, 234; 384/548, 492, 463, 564

(56) References Cited

U.S. PATENT DOCUMENTS

| | | | |
|---|---|---|---|
| 569,632 A | * | 10/1896 | Garrood ...................... 474/209 |
| 2,428,060 A | * | 9/1947 | Albrecht ...................... 474/209 |
| 4,705,411 A | | 11/1987 | Kellstrom |
| 4,795,408 A | * | 1/1989 | Kotegawa et al. .......... 474/209 |
| 4,915,511 A | * | 4/1990 | Kotegawa et al. .......... 384/127 |
| 4,932,927 A | | 6/1990 | Fillar |
| 5,482,385 A | * | 1/1996 | Yokota et al. ............... 384/572 |
| 5,823,686 A | | 10/1998 | Murano et al. |
| 6,070,711 A | | 6/2000 | Murano et al. |
| 6,102,573 A | * | 8/2000 | Morimoto et al. .......... 384/127 |
| 6,179,474 B1 | | 1/2001 | Podhajecki |
| 6,367,982 B1 | * | 4/2002 | Doi et al. .................... 384/565 |
| 6,390,685 B1 | * | 5/2002 | Shimomura et al. ........ 384/568 |
| 6,742,935 B2 | * | 6/2004 | Saji ............................. 384/587 |

FOREIGN PATENT DOCUMENTS

| | | | | |
|---|---|---|---|---|
| GB | 2246402 | * | 7/1991 | ........... F16G/13/06 |
| JP | 62-004122 | | 1/1987 | |
| JP | 11-082491 | | 3/1999 | |

* cited by examiner

*Primary Examiner*—David A. Bucci
*Assistant Examiner*—Vicky A. Johnson
(74) *Attorney, Agent, or Firm*—Howson and Howson

(57) ABSTRACT

A roller chain incorporates a plurality of rolling members between a roller and a bushing. A thrust bearing plate is provided between the end surfaces of the roller and inside surfaces of inner link plates. The outer diameter of the roller is smaller than the widths of the inner link plates and the outer link plates and the roller is accomodated in a projected area of the widths of the inner link plates and the outer link plates.

3 Claims, 9 Drawing Sheets

CHAIN

FIELD OF THE INVENTION

This invention relates to a chain incorporating a plurality of rolling members between a roller and a bushing, or between a roller and a pin.

BACKGROUND OF THE INVENTION

Figure 17:
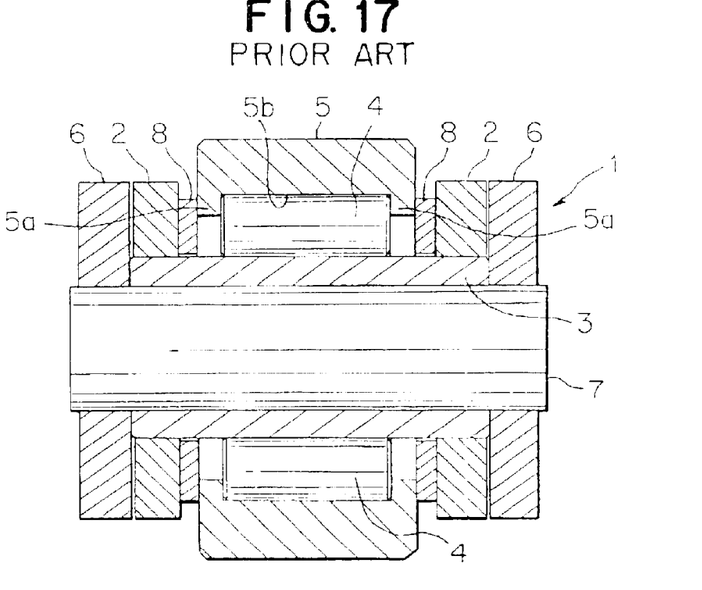
FIG. 17 is a cross-sectional view of a conventional chain.

FIG. 17 is a cross-sectional view of a chain incorporating rolling members, disclosed in Japanese Laid-open Patent Publication No. Sho. 62-4122 (Japanese Examined Patent Publication No. Hei. 4-78523).

The chain 1, shown in FIG. 17, includes a pair of inner link plates 2 spaced from each other in parallel relationship, and connected to a hollow, cylindrical bushing 3. Rolling members 4 are arranged on the outer circumferential surface of the bushing 3, and a roller 5, disposed between the inner link plates 2 surrounds the rolling members 4. Inwardly projecting collars 5a are integrally formed on the ends of the roller 5.

A recess portion 5b, for accommodating the rolling members 4, is formed between the inwardly projecting collars 5a. The collars 5a hold and guide the rolling members 4. A pair of outer link plates 6, spaced and in parallel relationship to each other, is arranged outside the pair of inner link plates 2. The outer link plates 6 are connected to each other by a pin 7, which extends through the hollow, cylindrical bushing 3.

Thrust bearing plates 8 are arranged between the inside surfaces of the inner link plates 2 and the end surfaces of the roller 5. The thrust bearing plates 8 fit onto the outer circumferential surface of the bushing 3 with a clearance. The thrust bearing plates 8 are ring plates made of a material such as a synthetic resin having low friction properties and excellent wear resistance. Suitable materials include fluorine resins, polyamide resins, oil-containing sintered metal, and ceramics.

As shown in FIG. 17, the outer diameter of the roller 5 is larger than the widths of the inner link plates 2 and the outer link plates 6. On the other hand, the outer diameter of the thrust bearing plate 8 is smaller than the widths of the inner link plates 2 and outer link plates 6.

Figure 20:
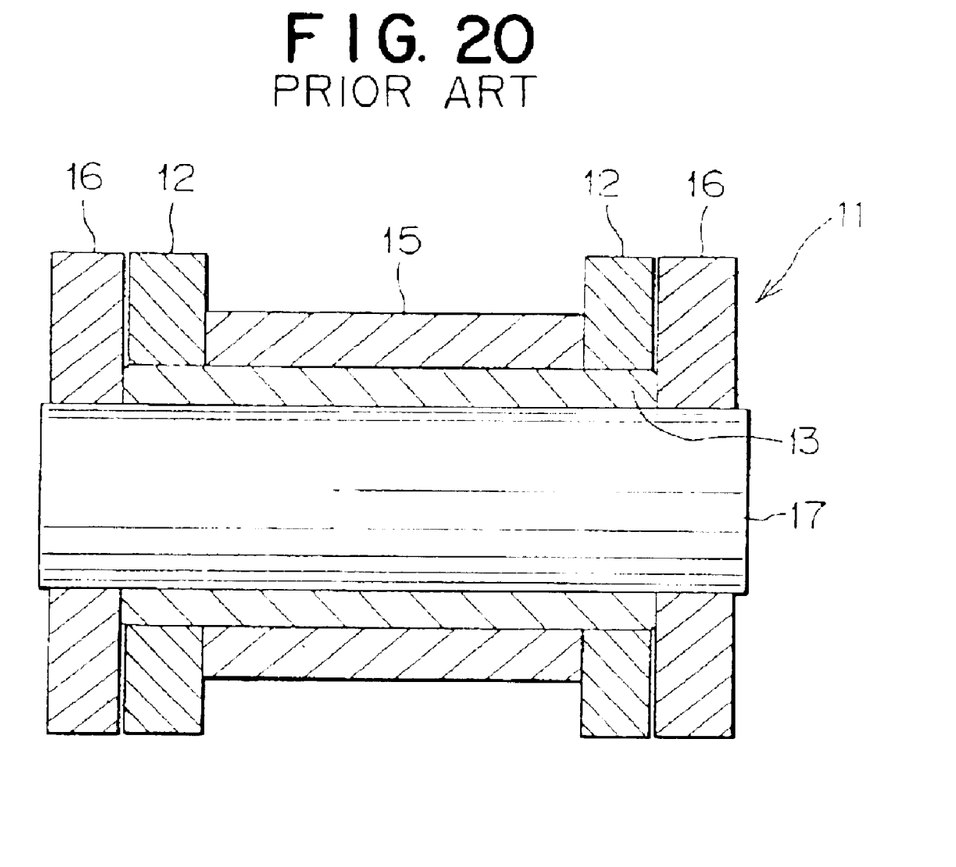
FIG. 20 is a cross-sectional view of another conventional chain.

Another conventional chain 11 is shown in cross-sectional view in FIG. 20. In chain 11, a two inner link plates 12, spaced from each other, and in parallel relationship, are connected by a hollow, cylindrical bushing 13. A cylindrical roller 15 is rotatable on the outer circumferential surface of the bushing 13 between the pair of inner link plates 12. Outer link plates 16, also in spaced, parallel relationship to each other, are arranged on the outer sides of the inner link plates 12. The outer link plates 16 are connected to each other by a pin 17, which extends through the bushing 13. The outer diameter of the roller 15 is less than the widths of the inner link plates 12 and outer link plates 16. In chain 11, the roller 15 and the bushing 13 form a slide bearing.

Figure 21:
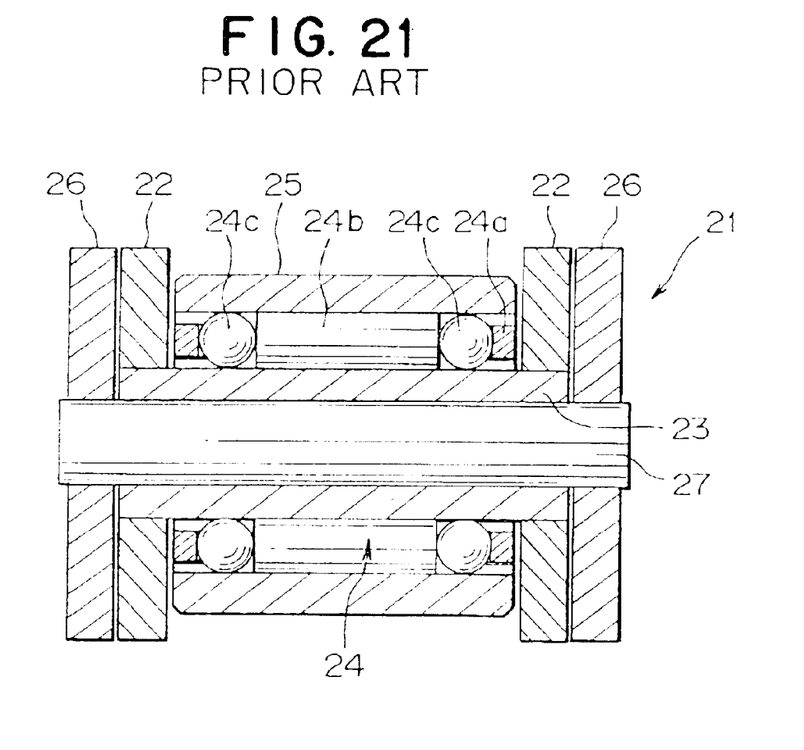
FIG. 21 is a cross-sectional view of still another conventional chain.
Figure 22:
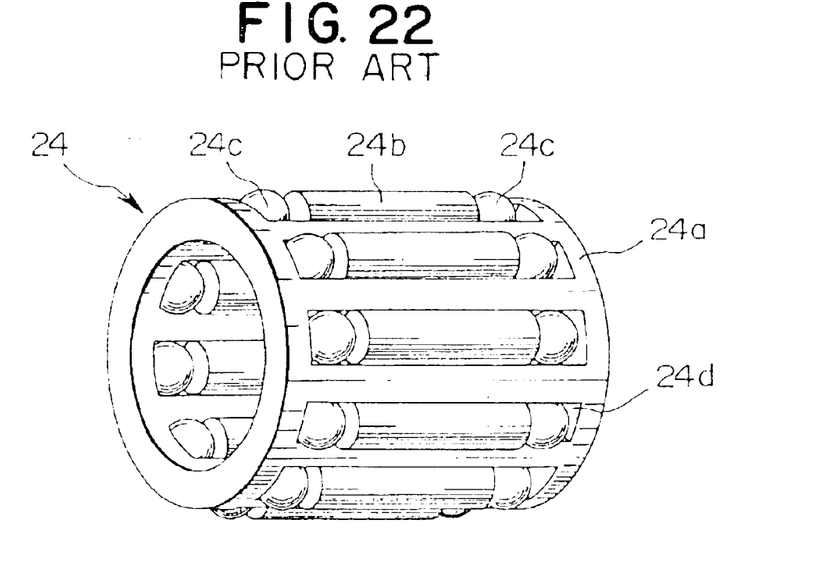
FIG. 22 is a perspective view of rolling members in a holder used in the chain in FIG. 21.

FIG. 21 is a cross-sectional view of a chain 21 incorporating composite rolling members, disclosed in Japanese Laid-open Patent Publication No. Hei. 11-82491. In chain 21, inner link plates 22, which are in spaced, parallel relationship to each other, are connected by a hollow cylindrical bushing 23. Rolling bodies 24 in a holder are arranged on the outer circumferential surface of the bushing 23. A cylindrical roller 25 is disposed between the pair of inner link plates 22 and surrounds the rolling bodies 24 and the holder. Each rolling body 24 comprises a rolling member 24b, and two balls 24c at opposite ends of the roller member, which also serve as rolling members. The holder 24a, as best shown in FIG. 22, is generally cylindrical in shape, and has elongated windows 24d in which the rolling members 24b and balls 24c are accommodated. Outer link plates 26 are arranged in spaced, parallel relationship to each other on the outsides of the pair of inner link plates 22. The outer link plates 26 are connected to each other by a pin 27, which extends through the bushing 23. The outer diameter of the roller 25 is less than the widths of the inner link plates 22 and outer link plates 26.

The chains of the prior art, shown in FIGS. 17–22 are subject to a number of problems. In the case of the chain shown in FIG. 17, for example, since the roller 5 and rolling member 4 are large, the chain 1 itself is heavy and a substantial amount of power is expended just to effect travelling movement of the chain itself.

Figure 19:
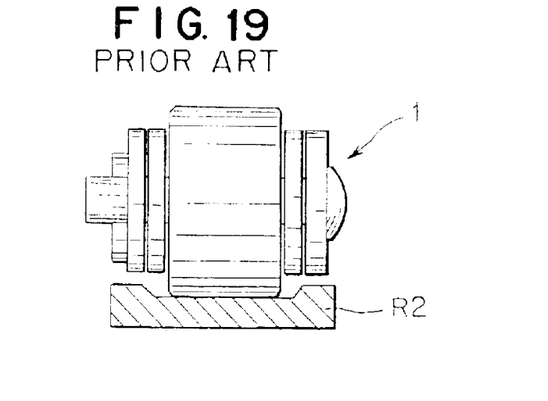
FIG. 19 is a schematic explanatory view showing the chain of FIG. 17 traveling on another type of rail.

A second problem with the chain shown in FIG. 17 is that, because the outer diameter of the roller 5 is larger than the widths of the inner link plates 2 and the outer link plates 6, when the roller 5 travels only on a rail R1 as shown in FIG. 1B, the chain is likely to snake. To prevent snaking of the chain 1 it is necessary to provide a rail R2 with a recess for guiding the roller 5, as shown in FIG. 19. However, the time and effort required to provide the rail R2 with a recess leads to substantial increase in the cost of the equipment which utilizes the chain.

A third problem is that the formation of the integral inwardly extending collar 5a on the roller 5 requires the cutting or grinding of a recess portion 5b in the interior of the roller. The cutting or grinding process is time-consuming and difficult, resulting in low productivity and increased cost.

A fourth problem is that, since the outer diameter of the roller 5 is large, shock and wear are likely to occur as the chain meshes with a sprocket.

A fifth problem is that attachments and conveyed materials can interfere with a portion of the roller 5 projecting beyond the inner link plates 2 and the outer link plates 6.

A sixth problem is that, although the rolling members 4 are arranged between the bushing 3 and the roller 5, an axial thrust load applied to the roller 5, results in skew of the rolling members 4 (that is, tilting of the rolling members 4 with respective to their proper axes of rotation). Thus, wearing and locking of the rolling members 4 can occur, preventing the rolling members 4 from rotating. This, in turn, prevents the roller 5 from rotating smoothly.

The chain 11 shown in FIG. 20 has no rolling members between its roller 15 and its bushing 13. The need for frequent oiling due to the sliding contact between the roller 15 and the bushing 13, requires many man-hours for maintenance.

A second problem with the chain of FIG. 20 is that heat generated due to the sliding contact between the roller 15 and the bushing 13 can exercise an adverse effect on material carried by the chain.

A third problem is that there is a relatively high coefficient of friction between the roller 15 and the bushing 13 because of their sliding contact, and consequently more power is required to move the chain.

A fourth problem is that, when a thrust load is applied to the chain 11, an end surface of the roller 15 slides against an inside surface of one of the inner link plates 12, generating wear, which reduces the thickness of the link plate 12 and reduces its breaking strength. Consequently, the inner link plates 12, the strength of which is essential to the tensile strength and integrity of the chain, are subject to breakage.

The chain 21 shown in FIG. 21 is also subject to several problems. First, when a thrust load is applied to the chain 21, an end surface of the roller 25 slides against an inside surface of one of the inner link plates 22, generating a large amount of wear. As in the case of the chain of FIG. 20, the thickness and strength of the inner link plates 22, which are essential to the tensile strength of the chain, decrease due to wear. Consequently the breaking strength of the inner link plates 22 is decreased and their breakage can result in failure of the chain.

Secondly, when a thrust load is applied to the chain, a ball 24c, which is on an end of a rolling member 24b, is loaded heavily, and the increased stress applied to the ball 24c causes rapid wear.

A third problem with the chain of FIG. 21 is that, because each rolling body 24 comprises not only a rolling member 24b, but also two balls 24c arranged at opposite ends of the roller member, 24b rolling member 24b, the component count in the chain is high, which results in high manufacturing cost and difficult assembly.

SUMMARY OF THE INVENTION

It is, accordingly, a general object of the invention to provide a chain provided with a plurality of rolling members between a roller and a bushing, or between a roller and a pin, which exhibits one or more of the following advantages: superior thrust load performance and reduced weight; simplified guidance of the chain on a rail or the like; reduced roller wear occurring when the chain meshes with a sprocket; capability of carrying an unlimited variety of materials or attachments; and smooth and reliable rotation of the rollers.

The chain in accordance with the invention comprises inner link plates and outer link plates extending along a longitudinal direction of the chain on both sides thereof. The inner and outer link plates on each side of the chain overlap one another, and the inner link plates have inside surfaces facing each other. A roller is located between two inner link plates. The roller is symmetrical about an axis of rotation and has end surfaces each end surface being adjacent an inside surface of one of said two inner link plates. A plurality of rolling members is provided inside the roller.

A thrust bearing plate is provided between each end surface of the roller and the adjacent inside surface of an inner link plate. The outer diameter of the roller is smaller than the widths of the inner link plates and the outer link plates, the widths being measured in directions mutually perpendicular to the axis of rotation of the roller and the longitudinal direction of the chain. The roller is positioned so that it is accommodated within projections of the widths of the two inner link plates between which the roller is located and also between projections of the widths of the portions of said outer link plates which overlap the two inner link plates, the projections being in the direction of the axis of the roller.

In certain preferred embodiments of the invention, the two inner link plates are connected by a bushing, and the rolling members are located inside the roller, between a cylindrical inside surface of the roller and the bushing. In other embodiments, the outer link plates on opposite sides of the chain are connected by pins, and the rolling members are located inside the roller, between a cylindrical inside surface of the roller and one of the pins.

In accordance with another aspect of the invention, a pair of substantially ring-shaped holders are provided adjacent the respective ends of the roller, each ring-shaped holder having a holding portion rotatably receiving the rolling members. Each thrust bearing plate is unitary with, and incorporated as a part of, one of the ring-shaped holders.

In certain preferred embodiments of the invention, the plurality of rolling members is composed of crowning rollers and relief end rolling members.

Thus, according to the invention, thrust bearing plates, which may be simple plates or parts of substantially ring-shaped holders, are arranged between the inside surfaces of the inner link plates and the end surfaces of the roller. When a thrust load is applied to the roller during the rotation of the roller, the thrust load is received by the inner link plate through the thrust bearing plate. Since the thrust bearing plate which receives a thrust load has a wide area for receiving the thrust load, superior thrust load performance is achieved.

Moreover, since the outer diameter of the roller is smaller than the widths of the inner and outer link plates, a rail can be arranged between the opposite inner link plates, so that guidance of the chain is simplified. Further, since the roller does not protrude beyond the inner and outer link plates, it cannot interfere with material or attachments carried by the chain. Miniaturization of the roller also achieves a weight reduction, and wear of the roller, when it meshes with a sprocket, is reduced.

When the rolling members are composed of crowning rolling members and relief end rolling members, stress concentration, which is generated at both ends of each rolling member is relieved, smoother rotation of the roller is ensured, and thrust and radial load performance is improved.

BRIEF DESCRIPTION OF THE DRAWINGS

FIG. 16 (A) is a side view used in the chain shown in FIG. 14;

DETAILED DESCRIPTION OF THE PREFERRED EMBODIMENT

The first embodiment of the invention will be described with reference to FIGS. 1, 2 and 3.

Figure 1:
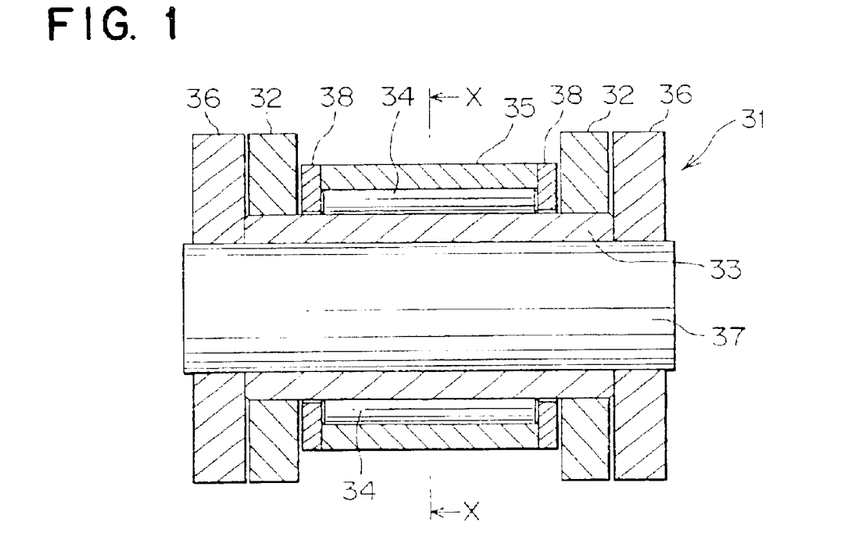
FIG. 1 is a cross-sectional view of a chain according to a first embodiment of the invention.

In a chain 31 shown in FIG. 1, two inner link plates 32, spaced from, and in parallel relationship to, each other, are connected by a hollow, cylindrical bushing 33. A plurality of rolling members 34 is arranged on the outer circumferential surface of the bushing 33, and a cylindrical roller 35, disposed between the pair of inner link plates 32, surrounds the rolling members 34. As shown in FIG. 2, the rolling members 34 are arranged next to one another, without a holder. Two outer link plates 36 are arranged on the outsides of the pair of inner link plates 32, in spaced, parallel relationship to each other. The outer link plates 36 are connected to each other by a pin 37, which extends through the bushing 33. The inner and outer link plates on each side extend in the longitudinal direction of the chain, and overlap one another as in a conventional roller chain.

As shown in FIG. 1, thrust bearing plates 38 are arranged between the inside surfaces of the inner link plates 32 and the end surfaces of the roller 35. Each thrust bearing plate 38 fits onto the outer circumferential surface of the bushing 33 with clearance, and the inside surface of the thrust bearing plate 38 is opposed to the end surfaces of the rolling members 34. As shown in FIG. 3, the thrust bearing plate 38 is a ring-shaped plate and is made of a material having low friction and high wear resistance, preferably a synthetic resin such as fluorine resin or polyamide resin, or oil-containing sintered metal, or ceramics.

Figure 2:
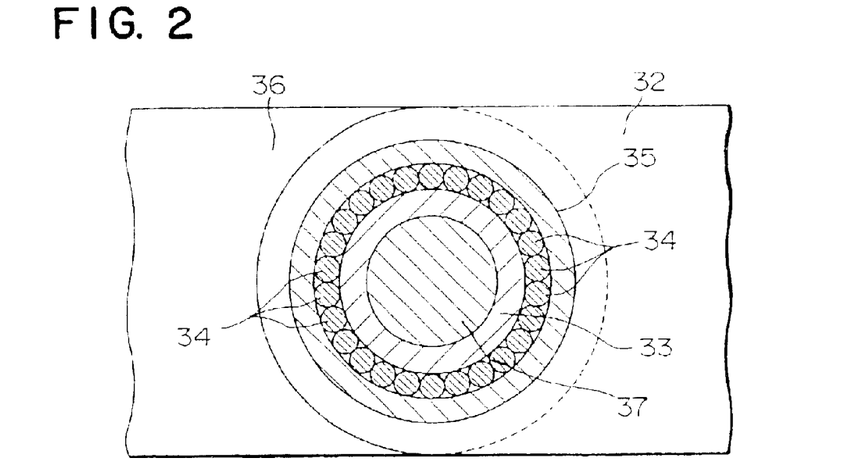
FIG. 2 is a cross-sectional view taken on plane X—X in FIG. 1.
Figure 3:
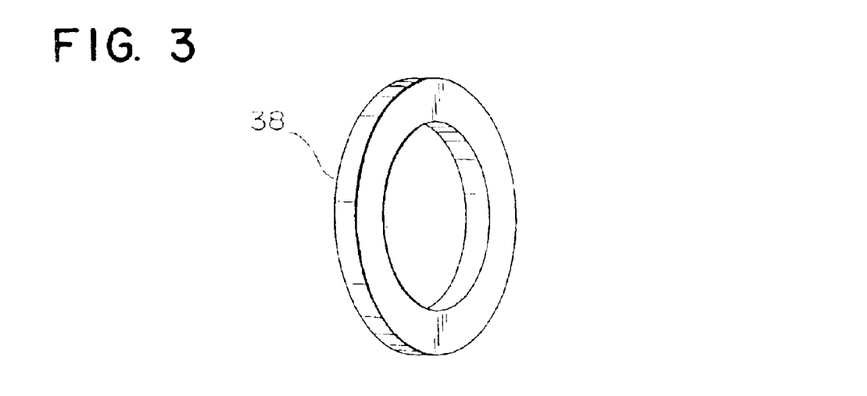
FIG. 3 is a perspective view of a thrust bearing plate used in the chain shown in FIG. 1.

The chain 31 is constructed in such a manner that the outer diameter of the roller 35 is smaller than the widths of the inner link plate 32 and the outer link plate 36 and the roller 35 is accommodated within projections of the widths of the inner link plate 32 and the outer link plate 36, as shown in FIGS. 1 and 2. That is, if the areas of the faces of the inner and outer link plates are projected laterally, in the direction of the roller axis, the roller is entirely within each of the volumes resulting from the projections. Therefore, the roller 35 does not project beyond the widths (i.e., the height in FIGS. 1 and 2) of the inner link plate 32 and outer link plate 36. The outer diameter of the thrust bearing plate 38 is preferably substantially the same as that of the roller 35.

In the chain 31 shown in FIG. 1, the thrust bearing plates 38 are arranged between the inside surfaces of the pair of inner link plates 32 and the end surfaces of the roller 35, respectively. Thus, a thrust load applied to the roller 35 is received by the inner link plate 32 through the thrust bearing plate 38. Since the thrust bearing plate 38 has a wide area, to receive the thrust load, good thrust load performance is achieved. Thus, in contrast with the conventional chains shown in FIGS. 20 and 21, where a thrust load applied to the rollers causes significant wear generated by the relative sliding of the end surfaces of the rollers and the inside surfaces of the inner link plates, in the embodiment of the invention illustrated in FIGS. 1–3, corresponding wear is greatly reduced.

Because the chain 31 is constructed in such a way that the outer diameter of the roller 35 is smaller than the widths of the inner link plate 32 and outer link plate 36, the chain is lighter in weight than the conventional chain shown in FIG. 17. The weight reduction in the chain permits a reduction in the power needed to move the chain. The rolling members 34, arranged between the roller 35 and the bushing 33, reduce the resistance of the roller 35 to rotation, and thereby also contribute to a reduction the resistance of the chain to movement, so that the chain is less resistant to movement than the conventional chain shown in FIG. 20. Since the outer diameter of the roller 35 is smaller than the widths of the inner link plate 32 and outer link plate 36, and the roller 35 is accommodated in a volume which is a projection of the areas of the inner link plate 32 and outer link plate 36, a rail may be arranged between the opposed inner link plates 32, and, as a result, the guidance of the chain is simpler than in the case of the conventional chain shown in FIG. 17.

The outer diameter of the roller 35 of the chain 31 is smaller than in the conventional chain shown in FIG. 17, and, at the same time, the rotation of the roller 35 is smoother than in the conventional chain shown in FIG. 20. Thus, wear of the roller 35, resulting from meshing with a sprocket, is reduced. Furthermore, because of the weight reduction achieved by reducing the size of roller 35, and its smoother rotation resulting from the use of rolling members 34, a reduction in the noise produced by the chain as it travels is achieved.

Since the roller 35 does not project beyond the inner and outer link plates 32 and 36, the roller does not interfere with materials carried by the chain, or with attachments to the chain. Accordingly, the presence of the roller does not limit the kinds of materials and attachments that can be carried by the chain. Furthermore, since the rotation of the roller 35 is smoother than in a conventional chain as shown in FIG. 20, intermittent sticking of the chain 31 does not occur, and a smooth conveying operation can be carried out with the chain.

The rolling members 34 are arranged next to one another, without a holder. The number of rolling members 34 is large, the radial load applied to the rolling members 34 is distributed, and accordingly, up-and-down motion of the roller 35, as it rolls, is decreased. Up-and-down motion of the material carried by the chain is also decreased, so that superior positioning accuracy is possible.

Figure 5:
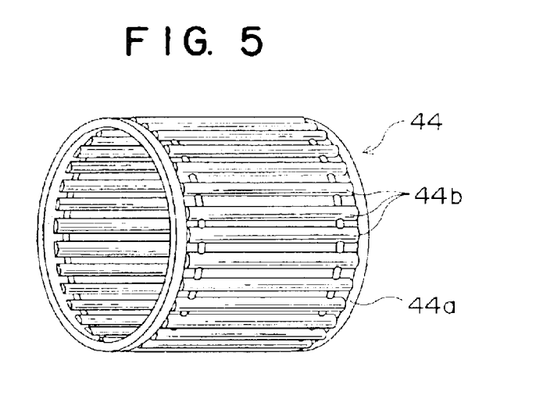
FIG. 5 is a perspective view showing rolling members in a holder used in the chain shown in FIG. 4.
Figure 6:
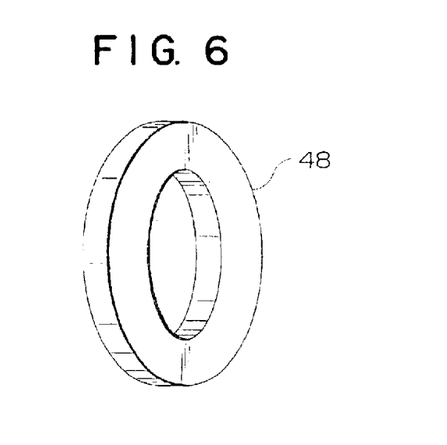
FIG. 6 is a perspective view of a thrust bearing plate used in the chain shown in FIG. 4.

A second embodiment of the invention will now be described with reference to FIGS. 4, 5 and 6.

Figure 4:
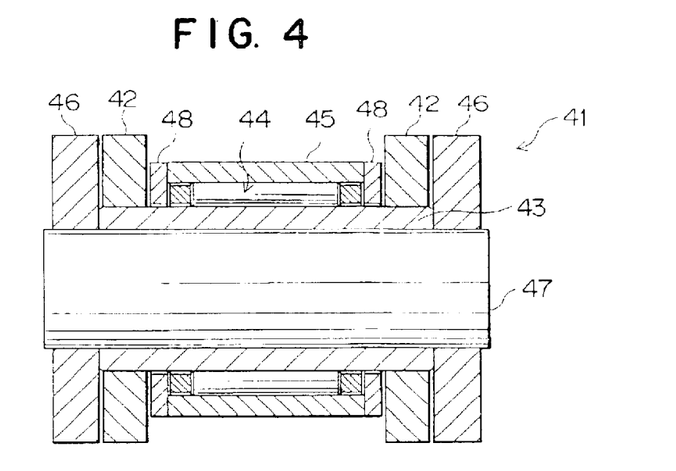
FIG. 4 is a cross-sectional view of a chain according to a second embodiment of the invention.

In a chain 41 shown in FIG. 4, two inner link plates 42, spaced, and in parallel relationship to each other, are connected to each other by a hollow, cylindrical bushing 43. Rolling members 44, with a holder, are arranged on the outer circumferential surface of the bushing 43, and a cylindrical roller 45, surrounding the rolling members 44 with the holder, is disposed between the inner link plates 42. As shown in FIG. 5, the structure between the bushing 43 and the roller is composed of a cylindrical holder 44a and a plurality of rolling members 44b. The rolling members 44b are rotatably held in window holes in the holder 44a. A pair of outer link plates 46, in spaced, parallel relationship to each other, are arranged on the outsides of the inner link plates 42. The outer link plates 46 are connected to each other by a pin 47, which extends through the bushing 43.

As shown in FIG. 4, thrust bearing plates 48 are arranged between the inside surfaces of the inner link plates 42 and the end surfaces of the roller 45. The thrust bearing plates 48 fit onto the outer circumferential surface of the bushing 43 with a clearance, and the inside surface of the thrust bearing plates 48 are opposed to the end surfaces of the cylindrical holder 44a. As shown in FIG. 6, the thrust bearing plate 48 is a ring-shaped plate and is composed of a material having low friction and high wear resistance, preferably a synthetic resin such as fluorine resin or polyamide resin, or an oil-containing sintered metal, or ceramics. The chain 41 is constructed in such a manner that the outer diameter of the roller 45 is smaller than the widths of the inner link plates 42 and the outer link plates 46, and the roller 45 is accommodated within a projected area of the widths of the inner link plate 42 and the outer link plate 46, as shown in FIG. 4. Therefore, the roller 45 does not extend beyond the widths (i.e., height) of the inner link plate 42 and outer link plate 46. The outer diameter of the thrust bearing plate 48 is preferably substantially the same as that of the roller 45.

Since the rolling members 44b are held rotatably within the windows of holder 44a, skew of the rolling members 44b is prevented.

Other features are substantially the same as those of the chain 31 shown in FIG. 1, and the action and effects are also substantially the same.

Figure 8:
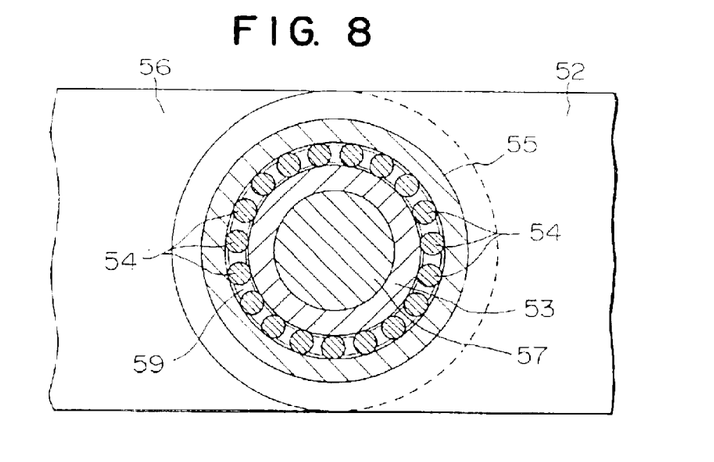
FIG. 8 is a cross-sectional view taken on the plane Y—Y in FIG. 7.
Figure 9A:
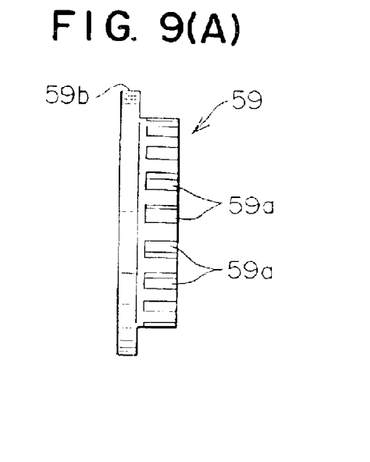
FIG. 9(A) is a side view of a substantially ring-shaped holder used in the chain shown in FIG. 7.
Figure 9B:
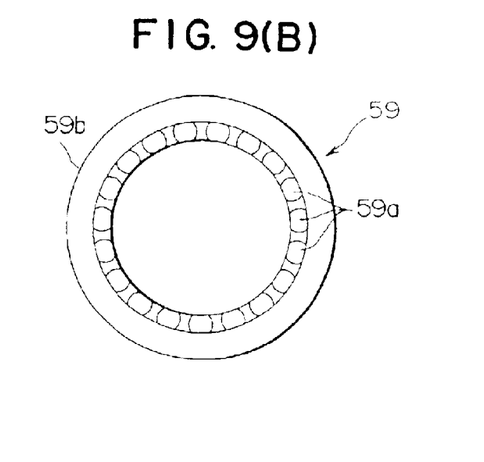
FIG. 9(B) is a front view of the substantially ring-shaped holder of FIG. 9(A)

A third embodiment of the invention will be described with reference to FIGS. 7, 8 and 9.

Figure 7:
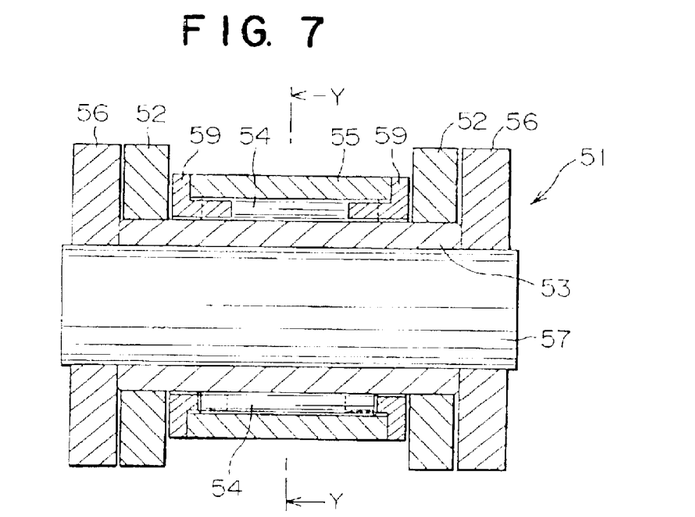
FIG. 7 is a cross-sectional view of a chain according to a third embodiment of the invention.

In the chain 51 shown in FIG. 7, inner link plates 52, spaced from each other, and in parallel relationship to each other, are connected by a hollow, cylindrical bushing 53. A plurality of rolling members 54 is arranged on the outer circumferential surface of the bushing 53, and a cylindrical roller 55, surrounding the plurality of rolling members 54, is disposed between the pair of the inner link plates 52, As shown in FIGS. 7 and 8, each of the rolling members 54 is held rotatably by a substantially ring-shaped holder 59. Outer link plates 56, in spaced, parallel relationship to each other are arranged on the outsides of the pair of inner link plates 52. The outer link plates 56 are connected to each other by a pin 57, which extends through bushing 53.

Substantially ring-shaped holders 59 are arranged between the inside surfaces of the pair of inner link plates 52 at both ends of the roller 55. As shown in FIGS. 9(A) and 9(B), each of the substantially ring-shaped holders 59 includes a plurality of pockets 59a, which rotatably hold end portions of the rolling members 54. The holders 59 also have outwardly extending flange portions 59b. The substantially ring-shaped holder 59 fits onto the outer circumferential surface of the bushing 53 with a clearance. Thus, the flange portions 59b of the substantially ring-shaped holder 59 are positioned between the inside surfaces of the inner link plates 52 and end surfaces of the roller 55, and each pocket 59a of the substantially ring-shaped holder 59 rotatably holds an end portion of a rolling member 54. Further, the substantially ring-shaped holder 59 is preferably composed of a material having low friction and high wear resistance, preferably a synthetic resin such as fluorine resin or polyamide resin, or an oil-containing sintered metal, or ceramics. The chain 51 is constructed in such a manner that the outer diameter of the roller 55 is smaller than the widths of the inner link plate 52 and outer link plate 56, and the roller 55 is accommodated within in a projected area of the widths of the inner link plate 52 and outer link plate 56, as shown in FIGS. 7 and 8. Therefore, the roller 55 does not protrude beyond the widths (i.e., height) of the inner link plate 52 or outer link plate 56. The outer diameters of the flange portions 59b of the substantially ring-shaped holders 59 are preferably substantially the same as the diameter of the roller 55.

The flanges of the substantially ring-shaped holders 59 are arranged between the inside surfaces of the inner link plates 52 and the end surfaces of the roller 55. Thus, a thrust load applied to the roller 55 is received by the inner link plate 52 through the substantially ring-shaped holder 59. Since the substantially ring-shaped holder 59, which receives a thrust load, has a wide area, good thrust load performance is achieved. Even when a thrust load is applied to the rollers, no significant wear is generated by sliding of the end surfaces of the rollers on the inside surfaces of the inner link plates. Moreover, when the roller 55 rotates, the rolling members 54 in contact with the inner circumferential surface of the roller 55 are rotated and rolling contact is generated. The rotation of the rolling members 54, in turn, rotates the substantially ring-shaped holders 59. In this case, the direction of rotation of the substantially ring-shaped holders 59 is the same as the direction of rotation of the roller 55. Nevertheless, the rate of rotation of the substantially ring-shaped holders 59 is less than the rate of rotation of the roller 55. Therefore, when the roller 55 is subjected to a thrust load, the relative sliding speed between the substantially ring-shaped holders 59 and the inner link plates 52 is low, and accordingly wear between the substantially ring-shaped holders 59 and the inner link plates 52 is suppressed.

The chain 51 shown in FIG. 7 is constructed in such a manner that the outer diameter of the roller 55 is smaller than the widths of the inner link plate 52 and outer link plate 56. Thus, the chain 51 shown in FIG. 7 is lighter in weight than the conventional chain shown in FIG. 17, and the weight reduction results in a reduction in the power required to operate the chain. Furthermore, since rolling members 54 are arranged between the roller 55 and the bushing 53, resistance of the roller to rotation is reduced, and resistance of the chain 51 to movement is accordingly lower than that in the case of the conventional chain shown in FIG. 20.

Since the chain 51 is constructed so that the outer diameter of the roller 55 is smaller than the widths of the inner link plate 52 and outer link plate 56, and the roller 55 is accommodated within a projected area of the widths of the inner link plate 52 and outer link plate 56, a rail may be arranged between the opposed inner link plates 52, simplifying guidance of the chain.

Since the outer diameter of the roller 55 is smaller than in the conventional chain shown in FIG. 17, and the rotation of the roller 55 is smoother than in the conventional chain shown in FIG. 20, wear of the roller 55, occurring as it meshes with a sprocket, is reduced. Furthermore, weight reduction in the roller 55 and smoother rotation of the roller 55 results in quieter operation of the chain as it travels.

Since, in the chain 51, the roller 55 does not protrude beyond the inner and outer link plates 52 and 56, the roller does not interfere with material carried by the chain, or with attachments. Accordingly, the roller does not impose any limit on the kinds of material or the kinds of attachments that can be carried by the chain. Further, since the rotation of the roller 55 is always smoother than in the conventional chain shown in FIG. 20, intermittent sticking of the chain 51 does not occur, and smooth operation is achieved.

Finally, in the chain 51 shown in FIG. 7, since the end portions of the rolling members 54 are rotatably held by pockets 59a, skew of the rolling members 54 can be prevented.

A fourth embodiment of the invention will now be described with reference to FIGS. 10, 11(A), 11(B) and 12.

Figure 10:
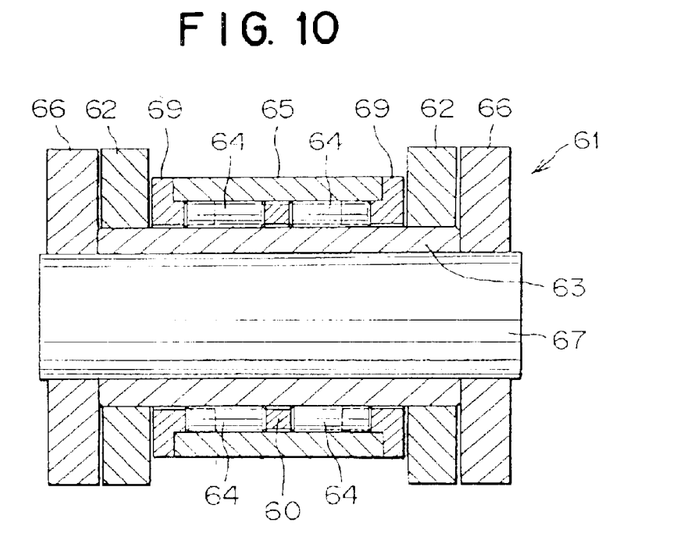
FIG. 10 is a cross-sectional view of a chain according to a fourth embodiment of the invention.

In a chain 61 shown in FIG. 10, a two inner link plates 62, in spaced, parallel relationship to each other, are connected by a hollow, cylindrical bushing 63. A plurality of rolling members 64 is arranged on an outer circumferential surface of the bushing 63 in two rows, i.e. left and right rows, and a cylindrical roller 65 surrounding the rolling members is disposed between the pair of the inner link plates 62. The rolling members 64 are rotatably held by substantially ring-shaped holders 69. Outer link plates 66, in spaced, parallel relationship to each other are arranged on the outsides of the pair of inner link plates 62. The outer link plates 66 are connected to each other by a pin 67, which extends through the bushing 63. The lengths of the rolling members in the respective left and right rows may be the same or different. A ring-shaped separator 60 is arranged on the outer circumferential surface of the bushing 63, between the rows of rolling members, separating the end portions of rolling members in the adjacent rows. This separator 60 is a ring plate, as shown in FIG. 12 and is preferably composed of a material having low friction and high wear resistance, preferably a synthetic resin such as fluorine resin or polyamide resin, or an oil-containing sintered metal, or ceramics.

Figure 11A:
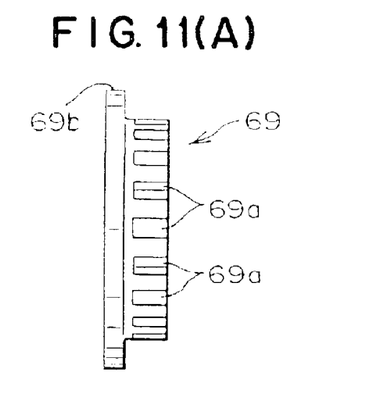
FIG. 11(A) is a side view of a substantially ring-shaped holder used in the chain shown in FIG. 10.
Figure 11B:
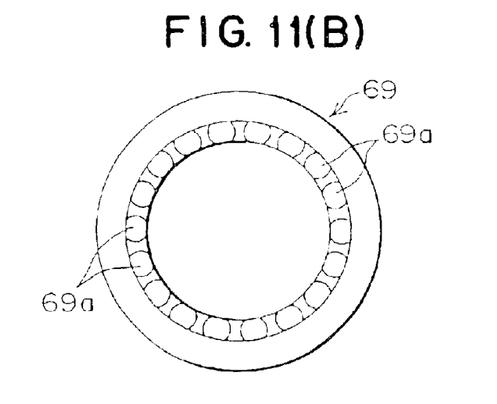
FIG. 11(B) is a front view of the substantially ring-shaped holder of FIG. 11(A)

As shown in FIG. 10, substantially ring-shaped holders 69 are arranged between the inside surfaces of the pair of inner link plates 62 at both ends of the roller 65. As shown in FIGS. 11(A) and 11(B), each of the substantially ring-shaped holders 69 includes a plurality of pockets 69a, which rotatably hold end portions of the rolling members 64. The holders 69 also have outwardly extending flange portions 69b. The substantially ring-shaped holder 69 fits onto the outer circumferential surface of the bushing 63 with a clearance. Thus, the flange portions 69b of the substantially ring-shaped holder 69 are positioned between the inside surfaces of the inner link plates 62 and end surfaces of the roller 65, and each pocket 69a of the substantially ring-shaped holder 69 rotatably holds an end portion of a rolling member 64. The substantially ring-shaped holder 69 is preferably composed of a material having low friction and high wear resistance, preferably a synthetic resin such as fluorine resin or polyamide resin, or an oil-containing sintered metal, or ceramics. The chain 61 is constructed in such a manner that the outer diameter of the roller 65 is smaller than the widths of the inner link plates 62 and outer link plates 66, and the roller 65 is accommodated within in a projected area of the widths of the inner link plate 52 and outer link plate 66, as shown in FIG. 10. Therefore, the roller 65 does not protrude beyond the widths (i.e., height) of the inner link plates 62 or outer link plates 66. The outer diameters of the flange portions 69b of the substantially ring-shaped holders 69 are preferably substantially the same as the diameter of the roller 65.

The left and right substantially ring-shaped holders 69 hold the end portions of the rolling members 64 in the left and right rows. Thus, the left and right substantially ring-shaped holders 69 are completely independent of each other and can rotate individually. Since the separator 60 is disposed between the left and right rows of rolling members, the left and right groups of rolling members do not interfere with each other and the reliable rotation of the roller 65 is maintained. Accordingly, even if one of the substantially ring-shaped holders 69 is compressed between an end surface of the roller 65 and the inside surface of one of the inner link plates 62 by the application of a large thrust load on the roller 65, a radial load applied to the roller 65 is supported by the rolling members 64 guided by the other substantially ring-shaped holder 69, so that smooth rotational movement of the roller can be maintained.

Figure 12:
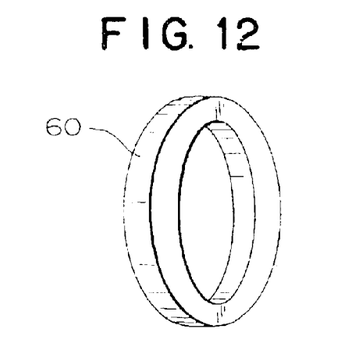
FIG. 12 is a perspective view of a separation plate used in the chain shown in FIG. 10.

Other features of the chain of FIGS. 10–12 are substantially the same as in the case of the chain shown in FIG. 7, and the action and effects are also substantially the same.

A fifth embodiment of the invention will be described with reference to FIG. 13.

Figure 13:
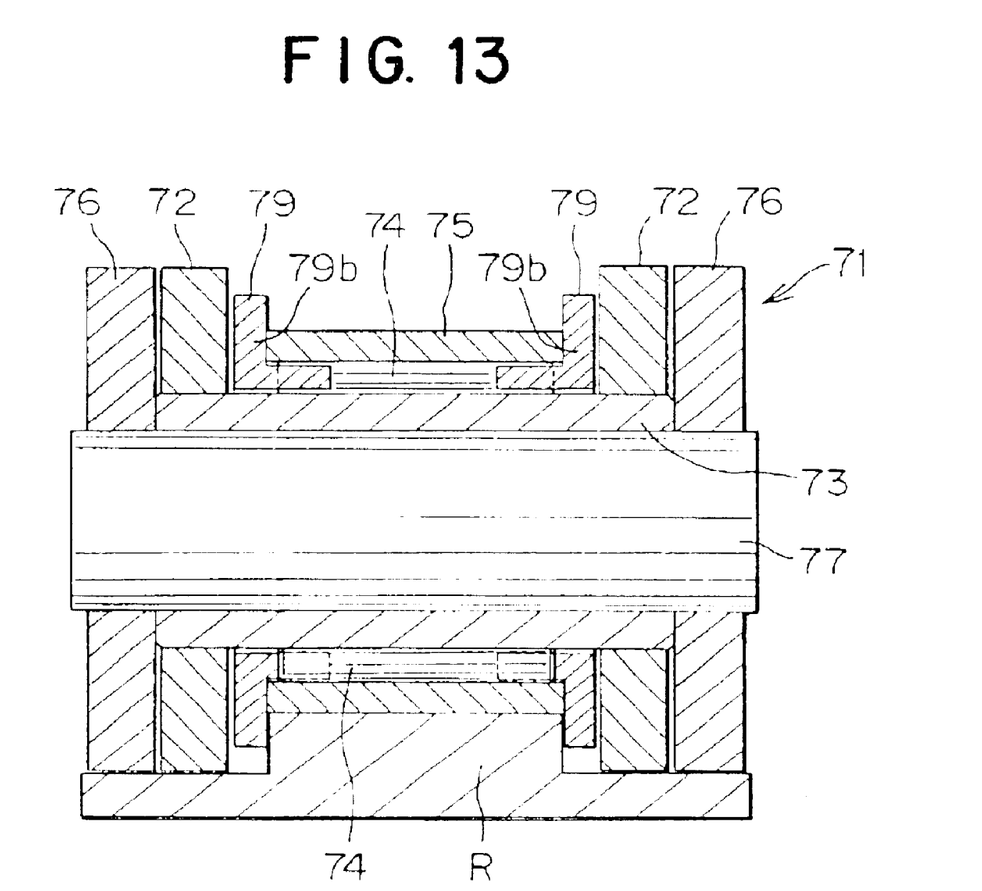
FIG. 13 is a cross-sectional view of a chain according to a fifth embodiment 5 of the invention, showing the chain traveling on a rail.

In the chain 71 shown in FIG. 13, inner link plates 72, spaced from each other, and in parallel relationship to each other, are connected by a hollow, cylindrical bushing 73. A plurality of rolling members 74 is arranged on the outer circumferential surface of the bushing 73, and a cylindrical roller 75, surrounding the plurality of rolling members 74, is disposed between the pair of the inner link plates 72, As shown in FIG. 13, each of the rolling members 74 is held rotatably by a substantially ring-shaped holder 79. Outer link plates 76, in spaced, parallel relationship to each other, are arranged on the outsides of the pair of inner link plates 72. The outer link plates 76 are connected to each other by a pin 77, which extends through a bushing 73.

The substantially ring-shaped holders 79 are arranged between the inside surfaces of the pair of inner link plates 72 at both ends of the roller 75. Although the substantially ring-shaped holder 79 is not shown in detail, it has substantially the same shape as that of the substantially ring-shaped holder 59 shown in FIGS. 9(A) and 9(B). The substantially ring-shaped holder 79 includes a plurality of pockets 79 (not shown), which rotatably hold the end portions of the rolling members 74 and outwardly extending flanges 79b. The holder 79 is different from the holder 59 shown in FIGS. 9(A) and 9(B) in that the outer diameter (the diameter of the flange 79b) of the holder. 79 is larger than the diameter of the roller 75. However, the diameter of the flange portion 79b is the same as, or less than, the widths of the inner link plates 72 and the outer link plates 76. The holder 79 fits onto the outer circumferential surface of the bushing 73 with a clearance. Thus, the flange portions 79b of the substantially ring-shaped holder 79 are positioned between the inside surfaces of the inner link plates 72 and the end surfaces of the roller 75 and each pocket of the substantially ring-shaped holder 79 rotatably holds an end portion of a rolling members 74. The holder 79 should be made from a material having low friction and superior wear resistance, preferably a synthetic resin such as fluorine resin or polyamide resin, or oil-containing sintered metal, or ceramics. The chain 71 is constructed in such a manner that the outer diameter of the roller 75 is smaller than the widths of the inner link plate 72 and the outer link plate 76 and the roller 75 is accommodated in a projected area of the widths of the inner link plate 72 and the outer link plate 76, as shown in FIG. 13. Therefore, the roller 75 does not protrude beyond the widths (i.e., height) of the inner link plates 72 and outer link plates 76.

In chain 71, since the outer diameter of the flanges 79b of both the left and right substantially ring-shaped holders 79 is larger than the outer diameter of the roller 75, the chain 71 can be guided by a rail R located between the inside surfaces of the opposed flanges portions 79b that project beyond the roller 75. Therefore, stable chain travel is achieved. Since the inside surfaces of the flanges 79b slide on the rail R, the inside surfaces of the inner link plates 72 do not contact the rail. Accordingly, in this embodiment friction of the inner link plate 72 is suppressed. If a thrust load is applied to the chain 71, the substantially ring-shaped holder 79 receives the load and slides together with the roller 75 and one of the inner link plates 72. Furthermore, a thrust load applied on the roller 75, is received by an inner link plate 72 through the substantially ring-shaped holder 79. Since the outer diameter of the flange 79b is larger than the outer diameter of the roller 75, the area of contact between the substantially ring-shaped holder 79 and the inner link plate 72 is large, and the thrust load properties of the chain are accordingly enhanced.

Other features of the chain of FIG. 13 are substantially the same as in the case of the chain shown in FIG. 7, and the action and effects are also substantially the same.

Figure 15:
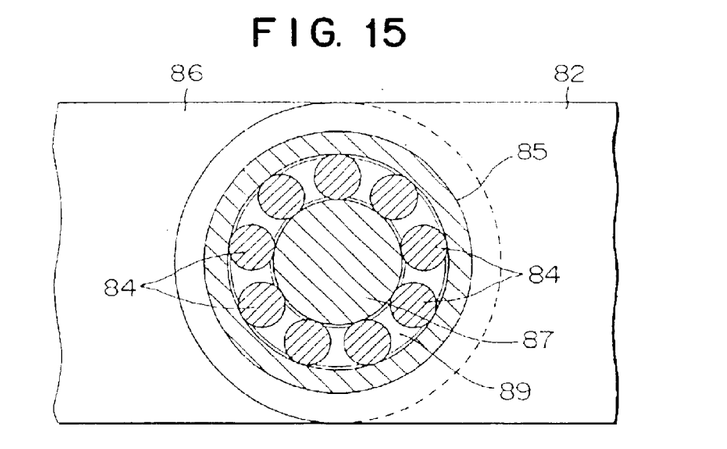
FIG. 15 is a cross-sectional view taken on plane Z—Z in FIG. 14.
Figure 16A:
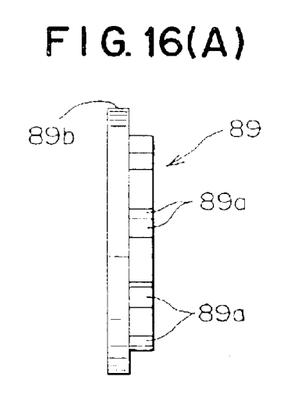
Figure 16B:
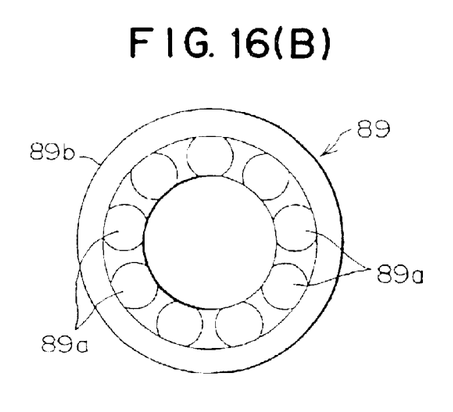
FIG. 16(B) is a front view of the substantially ring-shaped holder of FIG. 16(A)

A sixth embodiment of the invention will now be described with reference to FIGS. 14, 15 and 16.

Figure 14:
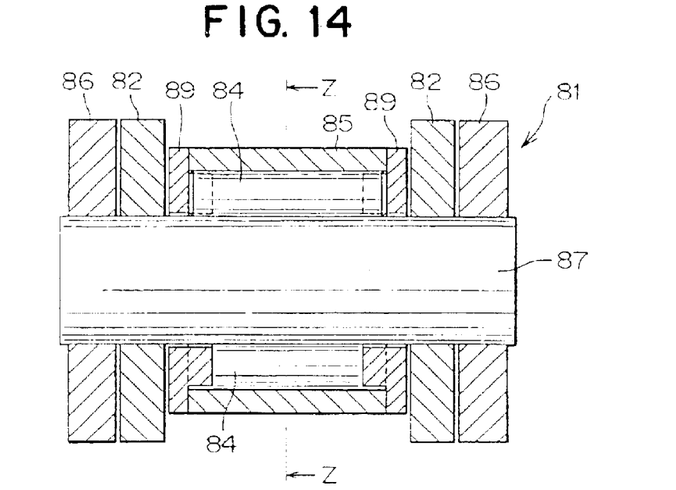
FIG. 14 is a cross-sectional view of a chain according to a sixth embodiment of the invention.

The chain 81 shown in FIG. 14 is different from the chain 51 shown in FIG. 7 in that the chain 81 does not use a bushing. In this bushingless chain, a pin 87 extends, with a clearance, through a pair of spaced, parallel, inner link plates 82. A plurality of rolling members 84 is arranged on the outer circumferential surface of the pin 87, and is surrounded by a cylindrical roller 85, disposed between the inner link plates 82. As shown in FIGS. 14 and 15, the rolling members 84 are held rotatably by a substantially ring-shaped holder 89. Outer link plates 86, spaced from each other and in parallel relationship to each other are disposed in overlapping relationship with the outsides of the inner link plates 82. The outer link plates 86 are connected to each other by the pin 87.

As shown in FIG. 14, flanges of the substantially ring-shaped holders 89 are disposed between the inside surfaces of the inner link plates 82 and the end surfaces of the roller 85. As shown in FIGS. 16(A) and 16(B), the substantially ring-shaped holders 89 include a plurality of pockets 89a, which rotatably hold end portions of the rolling members 84. The flanges 89b extend radially outward. The substantially ring-shaped holders 89 fit onto the outer circumferential surface of the pin 87 with a clearance. The flanges 89b of the substantially ring-shaped holder 89 are positioned between the inside surfaces of the inner link plates 82 and the end surfaces of the roller 85, and each pocket 89a holds an end portion of a rolling members 84 rotatably. The substantially ring-shaped holder 89 is preferably made of a material having low friction properties and high wear resistance, for example, as synthetic resin such as fluorine resin or polyamide resin, or an oil-containing sintered metal, or ceramics. The chain 81 is constructed in such a manner that the outer diameter of the roller 85 is smaller than the widths of the inner link plate 82 and the outer link plate 86 and the roller 85 is accommodated in a projected area of the widths of the inner link plate 82 and the outer link plate 86, as shown in FIGS. 14 and 15. Therefore, the roller 85 does not protrude beyond the widths (i.e., height) of the inner link plates 82 and outer link plates 86. The outer diameter of the flanges 89b of the substantially ring-shaped holder 89 is preferably substantially the same as that of the roller 85.

Since the chain 81 shown in FIG. 14 is a bushingless chain, it has a reduced number of parts, and accordingly a weight reduction can be realized.

Other features of the chain of FIGS. 14–16(B) are substantially the same as those of the chain shown in FIG. 7, and its action and effects are also substantially the same.

Although the sixth embodiment of the invention uses the substantially ring-shaped holder 89, a simple thrust bearing plate may be used in place of the holder 89.

In all six of the embodiments described above, the chain is constructed in such a manner that the outer diameter of the roller is smaller than the widths of the inner link plates and the outer link plates, and the roller is accommodated within a projected area of the widths of the inner link plates and the outer link plates. Accordingly, the gap between the inner diameter of the roller and the outer diameter of the bushing, or in the case of a bushingless chain, the gap between the inner diameter of the roller and the outer diameter of the pin, is inevitably small, and, as a result, the length of the rolling member will ordinarily be longer than its diameter. Therefore, stress is liable to be concentrated at both ends of the rolling members and the ends of the rolling members are subject to wear. To prevent the concentration of stress at the ends of the rolling members, the rolling members used in each of the six embodiments of the invention are preferably composed of crowning rolling members or relief end rolling members. A crowning rolling member is a rolling member that has a continuous, slight convex curvature in a plane including the central axis of the roller member. On the other hand, a relief end rolling member is a rolling member having slightly reduced diameters at both end portions of the roller member, that is, a rolling member in which both end portions of the rolling surface are slightly relieved in a smooth taper. By the use of either a crowning rolling member or a relief end roller member, stress concentration at both end portions of the rolling member is relaxed and smoother rotation of the roller is ensured. At the same time, thrust and radial load capabilities are improved. Thus, the load-carrying capacity of the chain is increased, and the chain can be used in place of a larger conventional chain. Moreover a reduction in the power required to operate the chain can be achieved.

The substantially ring-shaped holders used in the third, fourth, fifth and sixth embodiments of the invention include a plurality of pockets, which rotatably hold the end portions of the rolling members. However, the substantially ring-shaped holder does not necessarily include a plurality of pockets, and may instead include a plurality of projections which extend into recesses formed in the ends of the rolling members and thereby hold the rolling members rotatably.

The most important advantages of the invention may be summarized as follows.

First, with bearing plates or substantially ring-shaped holders arranged between inside surfaces of the inner link plates and end surfaces of the roller, when a thrust load is applied to the roller, the load is received by the inner link plate through the wide area of the thrust bearing plate or the holder, and improved thrust load performance is realized. Unlike the conventional chains shown in FIGS. 20 and 21, in the chain of the invention, there is no sliding between the end surfaces of the roller and the inside surfaces of the inner link plates and wear resulting from the thrust loading is greatly reduced.

Second, since the outer diameter of the roller is smaller than the widths of the inner link plates and the outer link plates, the chain of the invention is lighter in weight than the conventional chain shown in FIG. 17, and a reduction in power required to operate the chain can be realized.

Third, when the rolling members are arranged between the roller and a bushing, the resistance of the roller to rotation is smaller than in the case of the conventional chain shown in FIG. 20, and, accordingly, the travel resistance of the chain is decreased.

Figure 18:
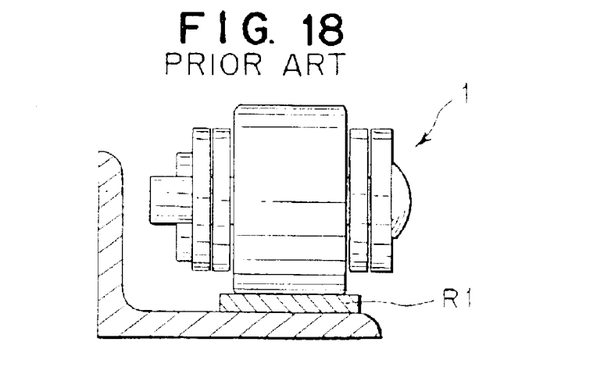
FIG. 18 is a schematic explanatory view showing the chain of FIG. 17 traveling on a rail.

Fourth, since the outer diameter of the roller is smaller than the widths of the inner link plates and the outer link plates, and the roller is accommodated in a projected area of the widths of the inner link plates and the outer link plates, a rail may be provided between the opposed inner link plates and guidance of the chain on a rail or the like is simpler than in the case of the conventional chain shown in FIGS. 17–19.

Fifth, since the outer diameter of the roller in the chain of the invention is smaller than that of the roller in the chain shown in FIG. 17, and the rotation of the roller is smoother than in the conventional chain shown in FIG. 20, wear of the roller, during meshing of the roller with a sprocket, is reduced.

Sixth, the weight reduction realized by the use of a smaller roller in the chain of the invention, and the smoother rotation of the roller compared to that in the conventional chain shown in FIG. 20, result in reduced noise as the chain is operated.

Seventh, unlike the conventional chain of FIG. 17, in which a roller projects beyond the inner and outer link plates, and potentially interferes with articles being carried or with attachments, in the chain of the invention, the roller does not project beyond the link plates, and does not interfere with articles being carried or with attachments, and does not impose limits on the kinds of articles or attachments that can be carried.

Eighth, since the rotation of the chain of the invention is smoother than in the conventional chain shown in FIG. 20, the intermittent sticking phenomenon of does not occur in the operation of the chain, and smooth conveying can be effected.

Finally if, in accordance with the invention, the rolling members are composed of crowning rolling members or relief end rolling members, in addition to the above-mentioned effects, stress concentration generated at the end portions of the rolling members is relaxed, and smoother rotation of the roller is ensured. At the same time, thrust and radial load abilities are improved. Thus, the load-carrying capacity of the chain is increased and the chain can be used in place of a larger chain. Moreover a reduction in the power necessary to operate the chain can be realized.

What is claimed is:

1. A chain comprising inner link plates and outer link plates extending along a longitudinal direction of the chain on both sides thereof, the inner and outer link plates on each side of the chain overlapping one another, the inner link plates having inside surfaces facing each other; a roller located between two inner link plates, the roller being symmetrical about an axis of rotation and having end surfaces, each end surface of the roller being adjacent an inside surface of one of said two inner link plates; and a plurality of rolling members inside the roller; wherein the outer diameter of said roller is smaller than the widths of said inner link plates and said outer link plates, said widths being measured in directions mutually perpendicular to said axis of rotation of the roller and the longitudinal direction of the chain; and said roller is positioned so that it is accommodated within projections of the widths of the two inner link plates between which the roller is located and also between projections of the widths of the portions of said outer link plates which overlap said two inner link plates, the projections being in the direction of the axis of the roller;

in which said two inner link plates are connected by a bushing having an outer circumferential portion in which the roller is a hollow roller having a cylindrical inside surface, and in which the rolling members of said plurality of rolling members are located inside the roller, between the cylindrical inside surface of the roller and the outer circumferential portion of the bushing;

including a pair of substantially ring-shaped holders adjacent both ends of said roller, each ring-shaped holder having a plurality of pockets formed therein, and each of said pockets rotatably receiving an end portion of one of said rolling members, thereby preventing skew of said rolling members; and in which each of said ring-shaped holders has an outwardly extending, thrust-bearing, flange, each said flange is located between an end surface of said roller and an adjacent inside surface of an inner link plate, and each of said ring-shaped holders fits onto the outer circumferential portion of the bushing with a clearance.

2. A chain according to claim 1, in which said plurality of rolling members is composed of rollers from the group consisting of crowning rollers and relief end rolling members.

3. A chain according to claim 1, in which each of the rolling members has two end portions, and each of the two end portions of each of said rolling members is received in a pocket of one of the ring-shaped holders.

* * * * *